(12) United States Patent
Wang

(10) Patent No.: US 6,985,852 B2
(45) Date of Patent: Jan. 10, 2006

(54) METHOD AND APPARATUS FOR DYNAMIC GRAMMARS AND FOCUSED SEMANTIC PARSING

(75) Inventor: YeYi Wang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 929 days.

(21) Appl. No.: 09/934,313

(22) Filed: Aug. 21, 2001

(65) Prior Publication Data
US 2003/0040901 A1   Feb. 27, 2003

(51) Int. Cl.
G06F 17/27   (2006.01)
G06F 17/28   (2006.01)

(52) U.S. Cl. .............................. 704/9; 704/7
(58) Field of Classification Search .................. 704/9, 704/10, 7
See application file for complete search history.

(56) References Cited

U.S. PATENT DOCUMENTS

| | | | | |
|---|---|---|---|---|
| 5,099,425 A | * | 3/1992 | Kanno et al. | 704/9 |
| 5,475,588 A | * | 12/1995 | Schabes et al. | 704/9 |
| 6,374,226 B1 | * | 4/2002 | Hunt et al. | 704/275 |
| 6,434,523 B1 | * | 8/2002 | Monaco | 704/257 |

OTHER PUBLICATIONS

Alabiso, B. et al. "LEAP: Language Enabled Applications," Proceedings of the First Workshop on Human-Machine Conversation, Bellagio, Italy (Jul. 1997).
Lavie, A., "GLR*: A Robust Parser for Spontaneous Spoken Language," Proceedings of ESSLLI-96 work-shop on Robust Parsing, Prague, Czech Republic (Aug. 1996).
Miller, S. et al., "Hidden Understanding Models of Natural Language," Proceedings of the 31st Annual Meeting of the Association for Computational Linguistics, New Mexico State University (1994).
Ward, W. et al., "The CMU Air Travel Information Service: Understanding Spontaneous Speech," Proceedings of the DARPA Speech and Natural Language Workshop (1990).
Ward, W. "Understanding Spontaneous Speech: the Phoenix System," IEEE International Conference on Acoustics, Speech and Signal Processing (1991).
Microsoft Speech SDK with SAPI 5.0, 94 pages (Sep. 1999).
Wang, K., "Implementation of Multimodal Dialog System Using Extended Markup Languages," 6 pages (undated).
Wang, K., "A Plan-based Dialog System With Probabilistic Inferences," 5 pages.
Wang, K., "An Event-Driven Model for Dialogue System," Proc. ICSLP-98, (Dec. 1998).
Gorrin, A. et al., "How May I Help You?" Speech Communications, vol. 23, (1997).

(Continued)

Primary Examiner—Richemond Dorvil
Assistant Examiner—Thomas E. Shortledge
(74) Attorney, Agent, or Firm—Theodore M. Magee; Westman, Champlin & Kelly, P.A.

(57) ABSTRACT

The present invention provides a dialogue system in which semantic ambiguity is reduced by selectively choosing which semantic structures are to be made available for parsing based on previous information obtained from the user or other context information. In one embodiment, the semantic grammar used by the parser is altered so that the grammar is focused based on information about the user or the dialogue state. In other embodiments, the semantic parsing is focused on certain parse structures by giving preference to structures that the dialogue system has marked as being expected.

7 Claims, 4 Drawing Sheets

OTHER PUBLICATIONS

"A Stochastic Model of Human-Machine Interaction for Learning Dialog Strategies," IEEE Transactions on Speech and Audio Processing, vol. 8, No. 1, pp. 11-23, (Jan. 2000).

"The Thoughtful Elephant: Strategies for Spoken Dialog Systems," IEEE Transactions on Speech and Audio Processing, vol. 8, No. 1, pp. 51-62, (Jan. 2000).

"Jupiter: A Telephone-Based Conversational Interface for Weather Information," IEEE Transactions on Speech and Audio Processing, vol. 8, No. 1, pp. 85-96, (Jan. 2000).

Wang, Y. "Robust Language Understanding in MIPAD," 4 pages (undated).

* cited by examiner

METHOD AND APPARATUS FOR DYNAMIC GRAMMARS AND FOCUSED SEMANTIC PARSING

BACKGROUND OF THE INVENTION

The present invention relates to methods and systems for parsing text. In particular, the present invention relates to semantic parsing of text.

Nearly all modern computer interfaces are based on computer driven interactions in which the user must follow an execution flow set by the computer or learn one or more commands exposed by the computer. In other words, most computer interfaces do not adapt to the manner in which the user wishes to interact with the computer, but instead force the user to interact through a specific set of interfaces.

New research, however, has focused on the idea of having a computer/user interface that is based on a dialogue metaphor in which both the user and the computer system can lead or follow the dialogue. Under this metaphor, the user can provide an initial question or command and the computer system can then identify ambiguity in the question or command and ask refining questions to identify a proper course of action.

Note that during the refinement, the user is free to change the dialogue and lead it into a new direction. Thus, the computer system must be adaptive and react to these changes in the dialogue.

The performance of such systems is dependent on the system's ability to quickly determine the user's goal. The longer it takes the system to understand the user's goal, the more frustrating it is for the user.

One obstacle to quickly understanding the user's goal is the richness of human language, which can cause strings of text to be associated with a large number of different semantic tags. This makes it difficult to identify the goal of the user because often there will be ambiguity about the semantic meaning of what the user has said. Thus, improvements are needed in dialogue systems to reduce the ambiguity associated with performing semantic parses of text, especially speech-based text.

SUMMARY OF THE INVENTION

The present invention provides a dialogue system in which semantic ambiguity is reduced by selectively choosing which semantic structures are to be made available for parsing based on previous information obtained from the user. In one embodiment, the semantic grammar used by the parser is altered so that the grammar is focused based on information about the user or the dialogue state. In other embodiments, the semantic parsing is focused on certain parse structures by giving preference to structures that the dialogue system has marked as being expected.

DETAILED DESCRIPTION OF ILLUSTRATIVE EMBODIMENTS

Figure 1:
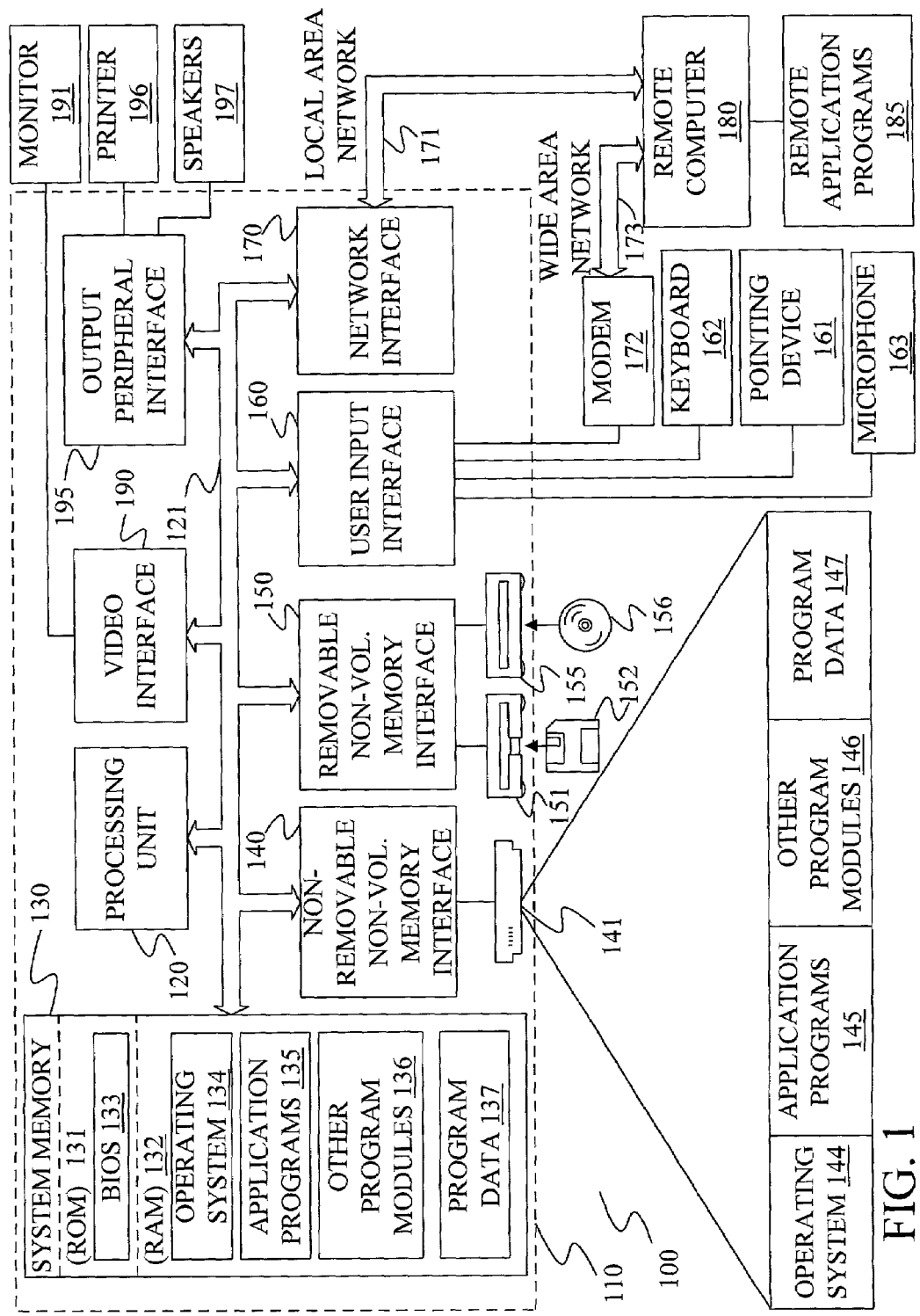
FIG. 1 is a general block diagram of a personal computing system in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
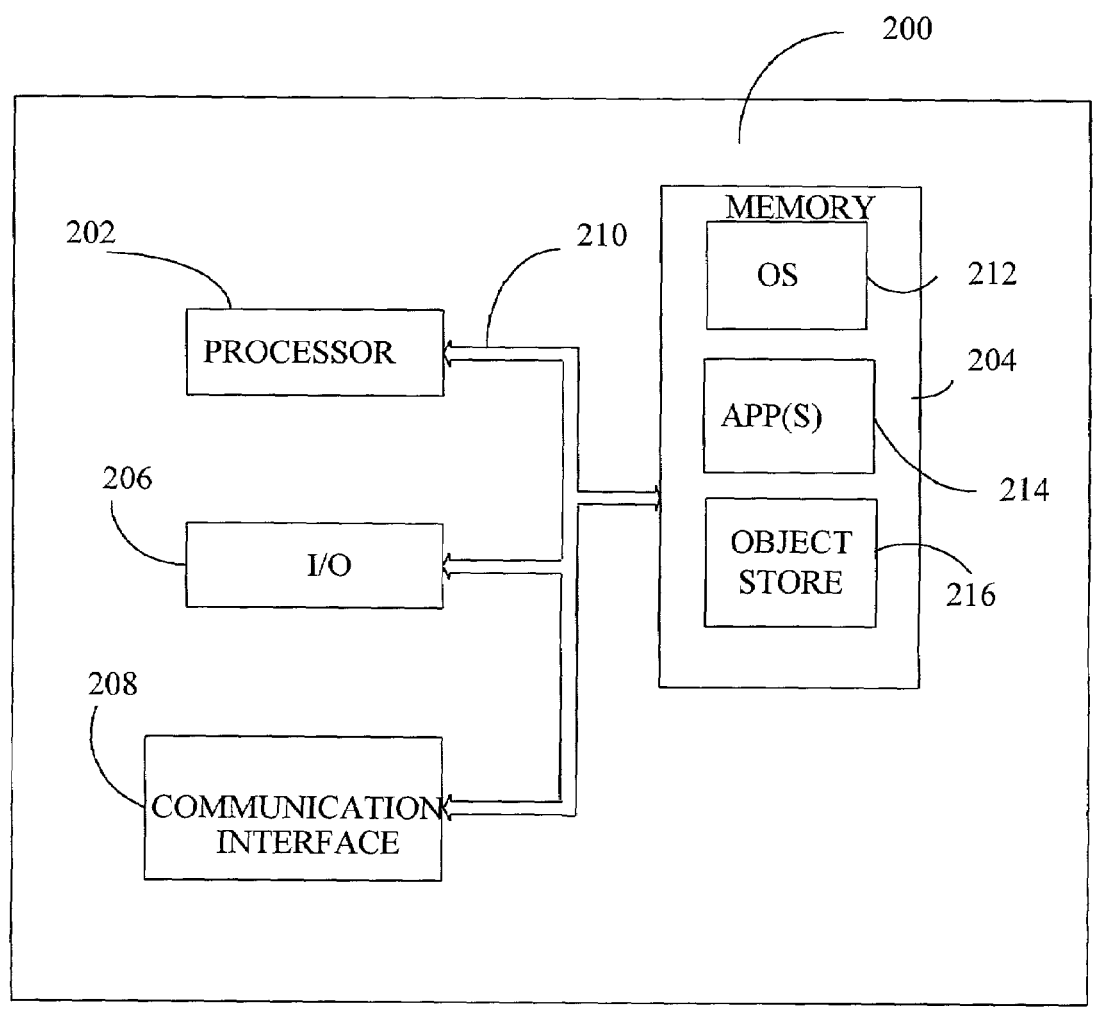
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
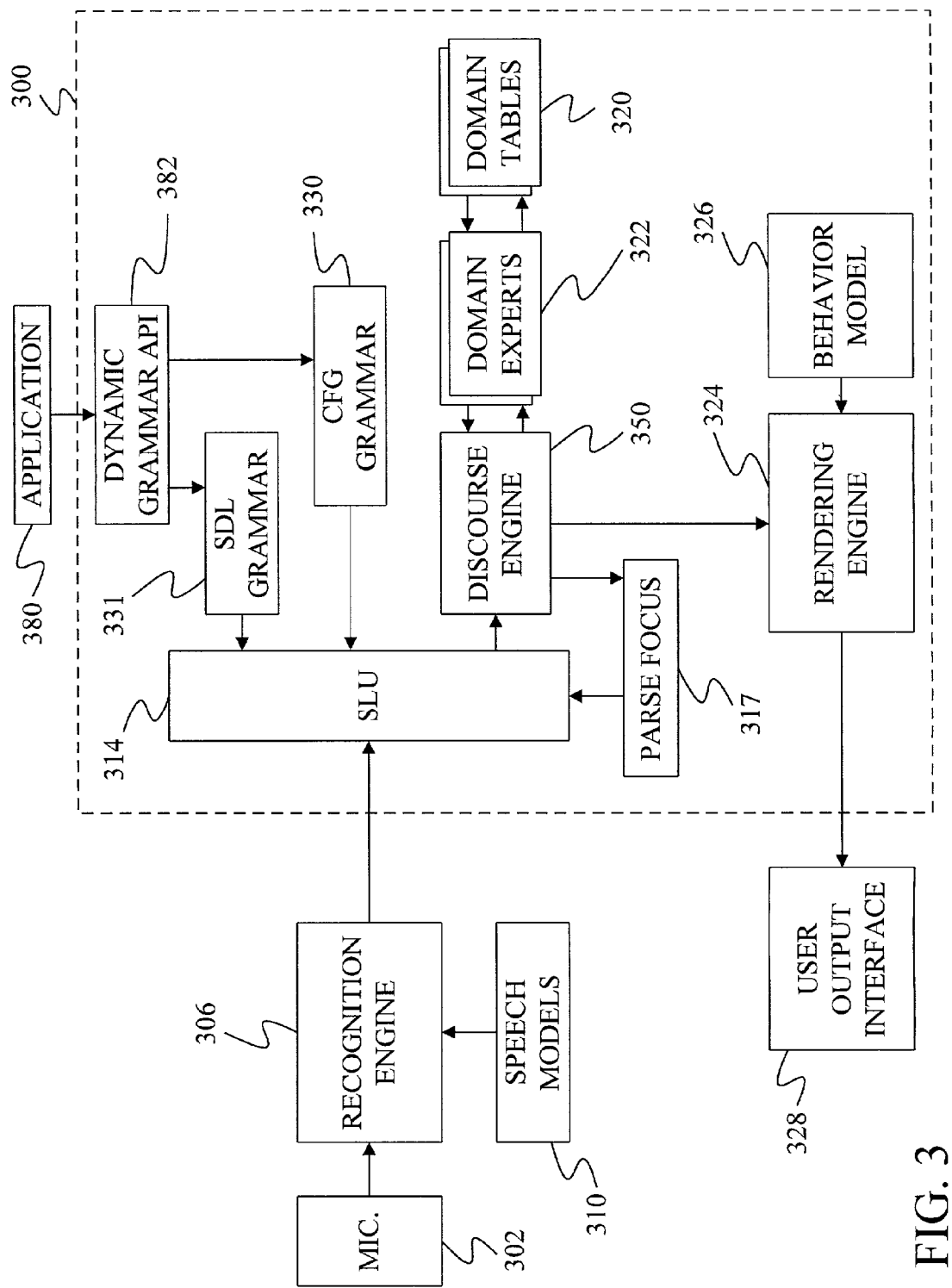
FIG. 3 is a block diagram of a dialogue system of the present invention.

FIG. 3 provides a block diagram of a dialogue system in which embodiments of the present invention may be practiced.

Under one embodiment of the invention, the components of FIG. 3 are located within a personal computer system, such as the one shown in FIG. 1, or a mobile device, such as the one shown in FIG. 2. In other embodiments, the components are distributed across a distributed computing environment and connected together through network connections and protocols. For example, the components could be distributed across an intranet or the Internet.

In FIG. 3, the dialogue system receives speech input from the user through a speech interface 302. Speech interface 302 converts the speech signal into a set of digital values that represent the speech signal. These digital values are provided to a speech recognition engine 306, which uses one or more models 310 to identify a set of text that is most likely represented by the speech signal. Such speech recognition engines and models are well known in the field of speech recognition.

Those skilled in the art will recognize that although a speech input is shown in FIG. 3, the present invention is not limited to speech inputs and may be used with direct text inputs.

The text generated by recognition engine 306 is provided to a dialogue manager 300, which is responsible for interacting with the user to identify the user's goal. In particular, the text is provided to a spoken language understanding (SLU) unit 314 within dialogue manager 300.

SLU 314 constructs semantic parse structures from the text using a context-free grammar 330 and a semantic description language (SDL) grammar 331. SDL is a language-independent grammar used to define the domain knowledge of entity relationship. An entity in SDL may correspond to several non-terminals in the semantic context free grammar. The CFG non-terminals define the linguistic expressions for the entity. Under one embodiment, context-free grammar 330 consists of non-terminals that are invoked by one or more rules. Each rule consists of a series of one or more non-terminals and/or words. Initially, SLU 314 uses context-free grammar 330 to identify surface semantics for the text by identifying non-terminals that are fully represented by the text. These non-terminals are then abstracted by the parser, according to the semantic description language 331, to build the language independent semantic entity structure, which provides descriptions of possible semantic structures that can be built from the surface semantic non-terminals.

Figure 4:
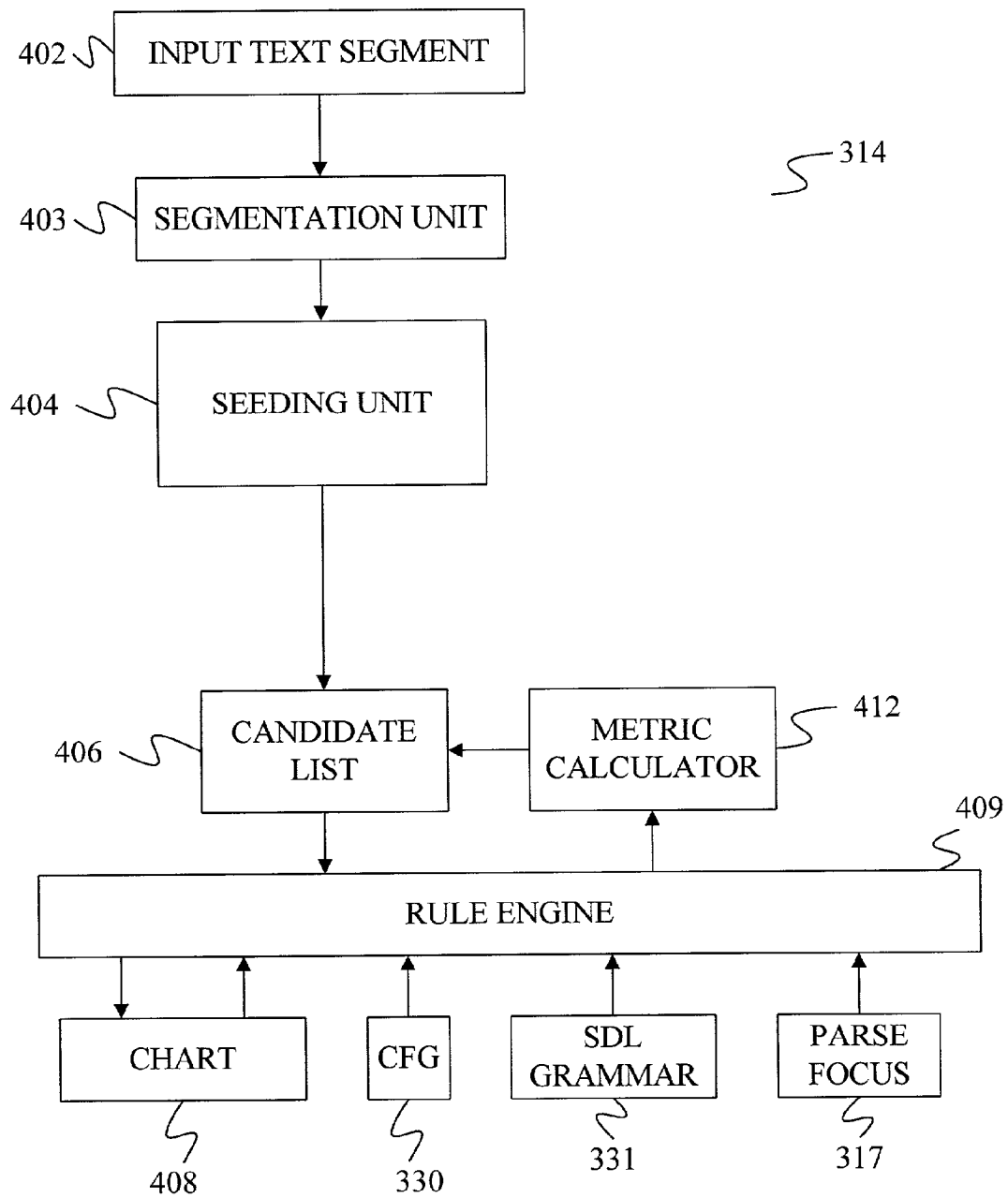
FIG. 4 is a block diagram of a semantic parser used by the spoken language understanding unit of FIG. 3.

FIG. 4 provides a more detailed block diagram of SLU 314. In SLU 314, a segmentation unit 403 divides an input text segment 402 into individual words, which are passed to a seeding unit 404. Seeding unit 404 places one of the words into a candidate list 406 each time the candidate list is empty.

The word in the candidate list is "popped" or removed from the candidate list by a rule engine 409. Rule engine 409 uses the popped word to access context-free grammar 330 to identify non-terminals that are activated by the promoted word. A non-terminal is said to be activated by a word or other non-terminal when the word or other non-terminal is the first child node in the definition of the non-terminal. In a left-to-right parser, the first child node is the left-most child. For example, the non-terminal <MEETING PROPERTY> is defined as <ABOUT><SUBJECT>, where <ABOUT> is the left-most child node and <SUBJECT> is the right-most child node.

If the activated non-terminal is only partially defined by the current word, a partial parse of the non-terminal is formed and is added to a chart 408. If the activated non-terminal is fully defined by the current word, the non-terminal is placed in the chart 408 and candidate list 406.

The word from the candidate list is also compared to partial parses in chart 408 to determine if the partial parses can be extended by the popped word. Partial parses that can be extended but not completed by the word are extended to generate new partial parses that are placed in chart 408. Partial parses that are completed by the word result in full parses that are placed in the chart 408 and candidate list 406.

Under many embodiments, before a non-terminal is placed in candidate list 406, it is scored by a metric calculator 412 based on some scoring metric. Under one embodiment, the scoring metric is based on the number of words covered by the non-terminal, the number of levels of non-terminals formed beneath the non-terminal, and the total number of non-terminals beneath the non-terminal. The score provided to a non-terminal is used to order the non-terminals in candidate list 406 so that non-terminals that are more likely to appear in the final parse are popped before other non-terminals.

Rule engine 409 removes the non-terminals placed in the candidate list one at a time. For each non-terminal, rule engine 409 determines if another non-terminal is activated by the popped non-terminal according to context-free grammar 330. Rule engine 409 also determines if any partial parses in chart 408 can be extended based on the popped non-terminal. It then updates the chart and candidate list. This continues until all of the non-terminals have been removed from the candidate list. At that point, the next word in the text segment is added to the candidate list.

During this process, if a non-terminal is popped from the candidate list and it does not activate another non-terminal or extend a partial parse, it is marked as a full parse. When all of the words of the text segment have been processed, the full parses with the highest score that have been popped from the candidate list 406 are mapped to semantic structures in the semantic description language grammar 331. These SDL structures are then provided to a discourse engine 350 as the semantic markup of the text.

In order to cover the different phrases a user may utter, context-free grammar 330 includes a large number of non-terminals. Because of this, a number of different semantic parse structures can be generated from a single speech utterance. Embodiments of the present invention provide means for controlling the construction and selection of semantic parse structures so that the complexity of parsing is reduced. These techniques are discussed further below.

The semantic parse structures generated by SLU 314 are used by discourse engine 350 to extend past partial semantic structures, if any, that were formed from previous text segments. Discourse engine 350 then attempts to collapse the semantic structures from the bottom up. To begin to collapse a discourse semantic structure, discourse engine 350 looks at each bottom level semantic non-terminal to determine whether it has enough information about the non-terminal to identify a single entity that can replace the non-terminal. In this context, an entity is an entry in one of a set of domain tables 320 that are accessed by one or more domain experts 322. The domain experts 322 identify which table needs to be accessed and updated, and handle the overhead and protocols associated with accessing the tables.

For example, to collapse a Person non-terminal, which is a general representation of a person, discourse engine 350 attempts to find a single person that meets the values parsed beneath the Person non-terminal. To do this, discourse engine passes the values parsed for the Person non-terminal to a domain expert 322 that specializes in identifying people from such values. For example, domain expert 322 can access a domain table 320 that lists people and certain attributes associated with those people. It then locates all people who satisfy the values for the person non-terminal. If only one such person is found, the Person non-terminal is collapsed and replaced by a unique identifier for the person. This identifier then becomes a value for the non-terminal located above the person non-terminal. If more than one person is found, an ambiguity is established that must be clarified by dialogue manager 300.

After the semantic structures have been collapsed as far as possible, the semantic structures and ambiguities identified by discourse engine 350 are passed to a rendering engine 324, which applies the semantic structures and the ambiguities to a behavior model 326. Behavior model 326 determines the cost of taking various actions given the current set of semantic structures and ambiguities.

The cost of different actions can be calculated based on several different factors. For example, since the usability of a dialogue system is based in part on the number of questions asked of the user, one cost associated with a dialogue strategy is the number of questions that it will ask. Thus, an action that involves asking a series of questions has a higher cost than an action that asks a single question.

A second cost associated with dialogue strategies is the likelihood that the user will not respond properly to the question posed to them. This can occur if the user is asked for too much information in a single question or is asked a question that is too broadly worded.

Based on the calculated costs, rendering engine 324 selects an action. Often times, this involves sending a response to the user through a user output interface 328.

As mentioned above, the present invention reduces the complexity of generating semantic structures for user input. Under one embodiment, this is achieved by parsing with focus.

When parsing with focus, SLU 314 gives preference to a semantic structure that has been previously identified as being likely given the current dialogue state. In particular, SLU 314 gives preference to a semantic structure path stored in a parse focus 317 by discourse engine 350.

For example, if a user first utters "I want to schedule a meeting", dialogue manager 300 will not know when to schedule the meeting. Therefore, rendering engine 324 will have to ask a follow-up question such as "On what date?" Since the answer to this question will likely be a date, discourse engine 350 sets the semantic path stored in parse focus 317 to "<ScheduleMeeting><MeetingProperty><Date>". This path indicates that a token or semantic class that satisfies the <Date> or <MeetingProperty> semantic classes without providing excess information should be parsed only as part of the <ScheduleMeeting> semantic class.

For example, if the user responds with "on Tuesday", the <Date> semantic class will be satisfied with Tuesday's date. However, the <Date> semantic class can be used in a large number of semantic structures such as:

<DeleteMeeting><Existingmeeting><Date>

To avoid this, SLU 314 uses the parse focus 317 to limit the structures it returns to discourse engine 350. As such, SLU 314 would only return the parse structure:

(<ScheduleMeeting>(<MeetingProperty>(<Date>(on Tuesday))))

and not the parse structure:

(<DeleteMeeting>(<ExistingMeeting>(<Date>(on Tuesday)))).

Note that parsing with focus can accommodate additional information provided by the user. Thus, if the user responds with "on Tuesday at 3 pm with John", rule engine 409 will generate a list of satisfied non-terminals that includes <Date>(on Tuesday), <Time>(at 3 pm), <attendees>(with John). Since these additional non-terminals are alternative child non-terminals for the <MeetingProperty>non-terminal, rule engine 409 will return:

(<ScheduleMeeting>(<MeetingProperty>(<Date>(on Tuesday), <Time>(at 3 pm), <attendees>(with John)))).

Thus, by focusing the parse based on a past dialogue state, the present invention reduces ambiguity in the parse and thus improves the performance of the dialogue system by reducing the number of questions that must be posed to the user to identify the user's goal.

In other embodiments, the complexity of the semantic parse is reduced by making the SDL grammar and the CFG grammar dynamic. In such embodiments, applications 380 of FIG. 3 are able to activate, deactivate, add, and/or remove entire non-terminals or individual rules for non-terminals. When working with an entire non-terminal, the dialogue system treats any child non-terminals that are unique to the non-terminal as being part of the non-terminal. Thus, when a parent non-terminal is removed by an application, child non-terminals that are unique to that parent non-terminal are automatically removed by the dialogue system. When working with individual rules, the dialogue system affects the rule without having to remove or add a non-terminal. Thus, the dynamic grammar of the present invention gives applications a great deal of power and flexibility to change the SDL grammar and CFG grammar so that the semantic parsing is more efficient.

For example, an application can make semantic parsing more efficient by changing the grammar based on the tasks that the user is likely to be performing. For instance, if a user is composing a new e-mail, the application can change the rules associated with the non-terminal <NAME> so that the rules only include names that the user can specify as recipients (i.e. names for which the application has an e-mail address). However, if the user is adding names to a contact list, the rules associated with the <NAME> non-terminal should be expanded to include common first and last names.

Similarly, the SDL grammar and CFG grammar can be altered based on the user. For example, different users can have different contact lists. As such, the rules of the <NAME> non-terminal can be changed so that they include the names of the current user's contact list.

Under some embodiments of the present invention, a set of Application Programming Interfaces (API's) 382 are provided that allow applications to request changes in the SDL and/or CFG grammars. API's 382 include methods that allow applications to activate and deactivate individual rules associated with a non-terminal("activate( )", "deactivate ( )"), methods to insert and delete non-terminals ("insertNonTerminal( )", "deleteNonTerminal( )", a method to remove all rules for a non-terminal ("clearNonTerminalRules( )"), methods to insert and remove individual rules for a non-terminal ("insertNonTerminalRule( )", "removeNonTerminalRule( )"), a method to import non-terminals from a different grammar ("importGrammar( )"), a method to import a grammar while first voiding non-terminals in the original grammar if similarly named non-terminals appear in the imported grammar ("importNreplaceGrammar( )"), and a method of forming a new grammar by merging two grammars together ("merge( )").

The activate( ) and deactivate( ) methods take a non-terminal as an argument and activate or deactivate the rules associated with that non-terminal.

The insertNonTerminal( ) method takes the name of the non-terminal to be created and returns a pointer to the newly created non-terminal object. The deleteNonTerminal( ) method takes the name of the non-terminal to be removed as input and deletes the non-terminal. In some embodiments, deleteNonTerminal( ) also deletes any rules or child non-terminals that are unique to the target non-terminal. For example, for a non-terminal <NAMES>, which is defined as:

```
<NAMES>
    Peter
    Joe
    Bill
</NAMES>
``` deleteNonTerminal(NAMES) would result in<NAMES> being removed from the grammar together with the rules "Peter", "Joe", and "Bill", if those rules are not used by other non-terminals. Note that deleting a non-terminal in SDL grammar 331 can involve deleting child non-terminals in SDL grammar 331 and the related non-terminals in the CFG grammar 330.

The clearNonTerminalRules method takes a pointer to a NonTerminal object as input. This pointer can be obtained using a GetNonTerminal( ) method, which returns a pointer to a NonTerminal object based on a name for the nonterminal. Using the clearNonTerminalRules method, all of the rules defined below the non-terminal are removed from the definition of the non-terminal. However, the non-terminal remains in the grammar. The clearNonTerminalRules method is a simple method for resetting a non-terminal before redefining the non-terminal.

If the application does not want to remove all of the rules associated with a nonterminal, it can use the removeNonTerminalRules( ) method, which takes a pointer to the nonterminal object and a string representing the rule to be removed as input. For example removeNonTerminalRules (&NAMES, Joe) would cause the rule "Joe" to be removed from the <NAMES> non-terminal defined above, without affecting the "Peter" or "Bill" rules. The insertNonTerminalRule( ) method allows applications to insert a single rule for a non-terminal. To insert a rule, the application provides a pointer to the nonterminal object and a text string representing the rule to be inserted.

The importgrammar( ) method and the importNreplaceGrammar( ) method both take a filename containing the grammar to be imported as input. In some embodiments, an additional boolean input value is provided to indicate whether the imported grammar is of a particular format. The merge( ) method takes a pointer to a CFG grammar object as input, and combines it with the grammar that makes the merge( ) call.

Although the present invention has been described with reference to preferred embodiments, workers skilled in the art will recognize that changes may be made in form and detail without departing from the spirit and scope of the invention. In particular, although the invention has been described above with reference to tree structures, any suitable data structure may be used and the invention is not limited to a tree-based structure.

What is claimed is:

1. A method of utilizing and modifying a grammar in a semantic parser, the method comprising:
   identifying a set of surface semantic non-terminals from user input using a context-free grammar;
   using a semantic description language grammar that describes relationships between semantic non-terminals to identify a semantic parse based in part on the identified semantic non-terminals;
   receiving an instruction to change the semantic description language grammar; and
   changing the semantic description language grammar based on the instruction by deleting a non-terminal through steps comprising:
      determining that the non-terminal is defined at least in part by a child semantic entity that does not define another non-terminal in the semantic description language grammar; and
      deleting the child semantic entity based on the determination.

2. The method of claim 1 wherein deleting a non-terminal comprises:
   determining that the non-terminal is defined at least in part by a child surface semantic non-terminal in the context free grammar that does not define another non-terminal in the semantic description language grammar; and
   deleting the child surface semantic non-terminal from the context-free grammar based on the determination.

3. The method of claim 2 wherein deleting the child surface semantic non-terminal comprises:
   determining if the child surface semantic non-terminal is defined by a rule that does not define another child surface semantic non-terminal; and
   deleting the rule based on the determination.

4. A computer storage medium having computer-executable instructions for performing steps comprising:
   receiving an instruction to change a non-terminal in a semantic description language grammar used in semantic parsing of text;
   accessing a stored grammar formed through the combination of a context-free grammar that links text to semantic non-terminals and the semantic description language grammar that links semantic non-terminals to each other; and changing the stored grammar based on the received instruction by changing a non-terminal in the semantic description language grammar and a non-terminal in the context-free grammar.

5. The computer storage medium of claim 4 wherein receiving an instruction comprises receiving an instruction to delete a non-terminal from the semantic description language and wherein changing the stored grammar comprises deleting the non-terminal from the semantic description language and a non-terminal from the context-free grammar based on the instruction.

6. The computer storage medium of claim 4 wherein changing the stored grammar comprises deleting a single rule associated with a non-terminal in the context-free grammar.

7. The computer storage medium of claim 4 wherein changing the stored grammar comprises inserting a single rule for a non-terminal in the context-free grammar.

* * * * *